E. FEINDEL.
VALVE LIFTING DEVICE.
APPLICATION FILED APR. 26, 1919.
1,329,518. Patented Feb. 3, 1920.
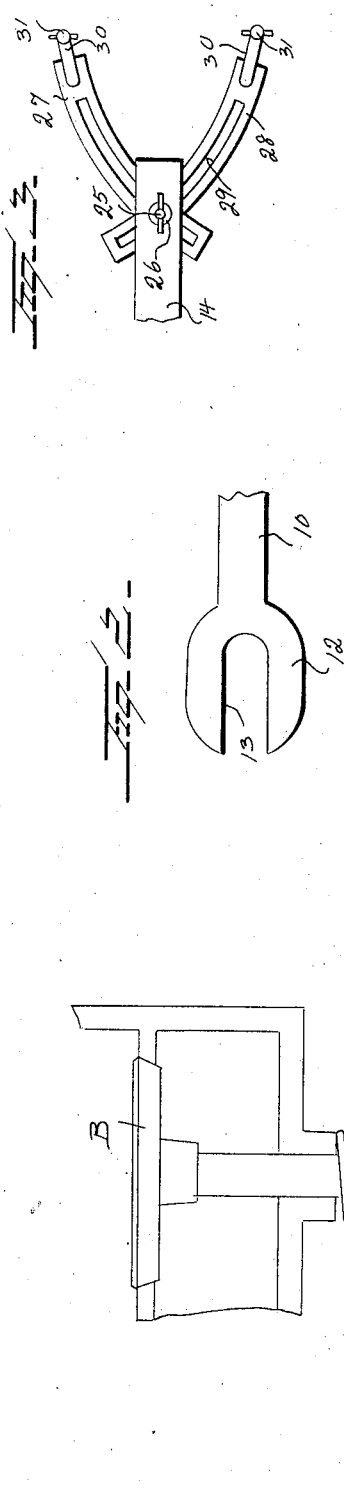
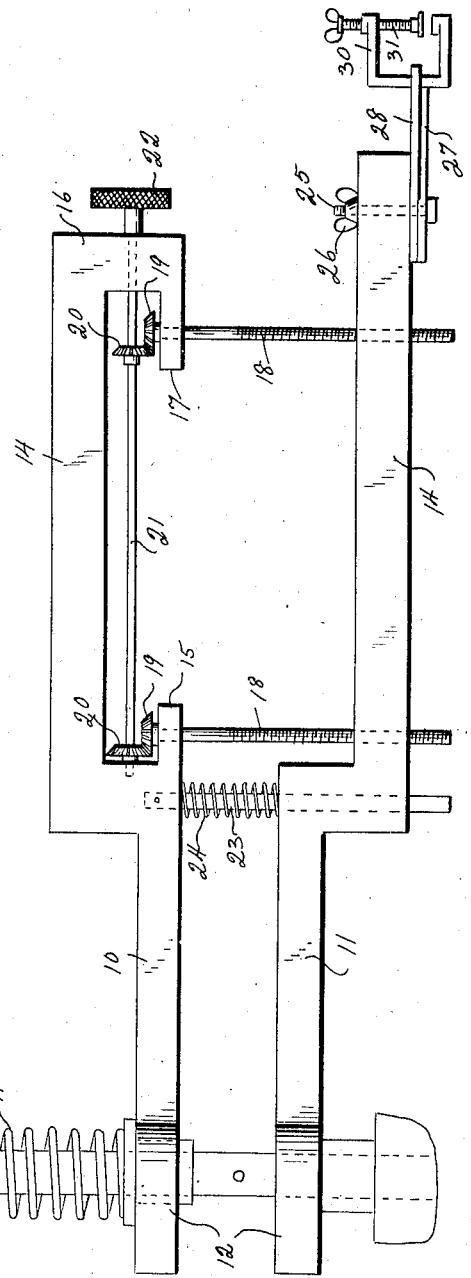
Inventor
E. Feindel
By Watson E. Coleman
Attorney

UNITED STATES PATENT OFFICE.

EDWARD FEINDEL, OF RICHFIELD, IDAHO.

VALVE-LIFTING DEVICE.

1,329,518.   Specification of Letters Patent.   Patented Feb. 3, 1920.

Application filed April 26, 1919. Serial No. 292,839.

*To all whom it may concern:*

Be it known that I, EDWARD FEINDEL, a citizen of the United States, residing at Richfield, in the county of Lincoln and State of Idaho, have invented certain new and useful Improvements in Valve-Lifting Devices, of which the following is a specification, reference being had to the accompanying drawings.

This invention relates to devices for lifting the valves of automobile engines, and has for its object the provision of a very simple, easily operated, and effective device of this character whereby the springs normally holding these valves closed may be compressed so as to permit the free manipulation of the valve.

A further object is to provide a construction of this character with means whereby the device may be readily attached to and temporarily mounted upon a motor car so as to leave both hands of the operator free.

Other objects will appear in the course of the following description.

My invention is illustrated in the accompanying drawings, wherein:—

Figure 1 is a side elevation of my valve lifting device in one of its applied positions;

Fig. 2 is a fragmentary plan view of one of the heads 12; and

Fig. 3 is a fragmentary plan view showing the supporting members 27 and 28 and a portion of the lower bar 14.

Referring to these drawings, it will be seen that my device comprises an upper member 10 and a lower member 11, each of these members being provided at one end with a head 12 formed with a longitudinally extending slot 13 of a size adapted to embrace a valve stem, but not the spring thereof. At their rear ends, these members 10 and 11 are off-set in vertical planes, as at 14. The forward shoulder of the off-set portion of the member 10 is provided with a rearwardly extending flange or lug 15, and the rear end of the portion 14 of the member 10 is downwardly turned, as at 16, and provided with a forwardly extending lug 17. In these lugs are disposed screws 18 which extend downward and have screw-threaded engagement with the off-set portion 14 of the member 11 so that when these screws are turned in one direction, the member 11 will be drawn toward the member 10 and when turned in the other direction, the member 11 will be forced away from the member 10. These screws 18 are provided at their upper ends above the lugs 15 and 17 with beveled gear wheels 19 and both of these beveled gear wheels are engaged by beveled gear wheels 20 mounted upon a longitudinally extending shaft 21 supported in bearings in the forward and rear end portions of the off-set portion 14 of member 10. At its rear end, the shaft 21 is provided with a head 22 whereby it may be turned.

A guide pin 23 is mounted in the member 10 and extends through the member 11, and a spring 24 is disposed between these members and is compressed when the members are forced toward each other, but expands as they are forced away from each other.

In order to support this device upon a motor car, I provide a clamping bolt 25 extending downward through the rear end of the off-set portion of the member 11, this clamping bolt being provided at its upper end with a wing nut 26 and with a head at its lower end. Connected to this clamping bolt are slightly curved arms 27 and 28 which are formed with longitudinally extending, arcuate slots 29 through which the bolt 25 passes. U-shaped clamps 30 are mounted at the ends of the arms so that they may be rotated or longitudinally shifted, these clamps being of any usual or suitable form, but being shown as approximately U-shaped and provided with clamping bolts 31, each extending through one of the arms of the U-shaped clamp. The members 28 are adapted to be shifted on the bolt 17 or swung into any desired position to bring the clamps into operative engagement with the car frame and then held in their adjusted position by tightening up on the wing nut 26.

By this means, my valve removing device may be readily engaged with any convenient portion of the car frame and held readily in position while the spring A of the valve B is being compressed by rotating the screws 18 so as to relieve the pressure on the valve and permit the removal of the valve.

In Fig. 1 I have illustrated my device applied for holding the spring A compressed, and in this case the lower jaw fits against the usual guide for the valve stem, while the upper jaw bears against the lower end of the spring. It is obvious, however, that the upper jaw might be applied against the under face of the valve casing and the lower jaw disposed against the lower end of the spring, and then by bringing the members 10 and 11 toward each other, the spring would be compressed and the valve could be raised.

I claim:—

1. Means for permitting the lifting of valves comprising oppositely disposed members having heads adapted to embrace the valve stem and engage the end of a spring, screws engaged by one of said members and having screw-threaded engagement with the other member whereby the members may be shifted toward or from each other, manually operable means for rotating said screws simultaneously, and adjustable frame engaging clamps mounted upon one of said members.

2. Means for permitting the lifting of valves comprising oppositely disposed members having heads adapted to embrace the valve stem and engage the end of a spring, screws engaged by one of said members and having screw-threaded engagement with the other member whereby the members may be shifted toward or from each other, manually operable means for rotating said screws simultaneously, adjustable frame engaging clamps mounted upon one of said members comprising longitudinally slotted arm carrying clamps proper at their extremities, and a clamping bolt passing through one of said members and through the slots of said arms.

3. Means for removing valves comprising oppositely disposed members having heads at one end slotted for engagement over a valve stem and for engagement on the opposite ends of a compression spring, screws carried by one of said members and having screw-threaded engagement with the other member, gear wheels mounted upon the heads of said screws, both gear wheels engaging the first named gear wheels, a shaft upon which the beveled gear wheels are mounted and carried by one of said members, and having means whereby it may be rotated, and frame clamping devices carried by the other member.

In testimony whereof I hereunto affix my signature in the presence of two witnesses

EDWARD FEINDEL.

Witnesses:
 EMMA PATRICK,
 EMMA KUNKEL.